G. E. RANDALL.
Bag Holder and Measure.

No. 43,706. Patented Aug. 2, 1864.

Witnesses:

Inventor:
G. E. Randall

UNITED STATES PATENT OFFICE.

GEORGE E. RANDALL, OF YAPHANK, NEW YORK.

IMPROVEMENT IN BAG-HOLDERS AND MEASURERS.

Specification forming part of Letters Patent No. 43,706, dated August 2, 1864.

*To all whom it may concern:*

Be it known that I, GEORGE E. RANDALL, of Yaphank, in the county of Suffolk and State of New York, have invented a new and Improved Bag-Holder and Measurer; and I do hereby declare that the following is a full, clear, and exact description thereof, which will enable others skilled in the art to make and use the same, reference being had to the accompanying drawings, making a part of this specification, in which—

Figure 1:
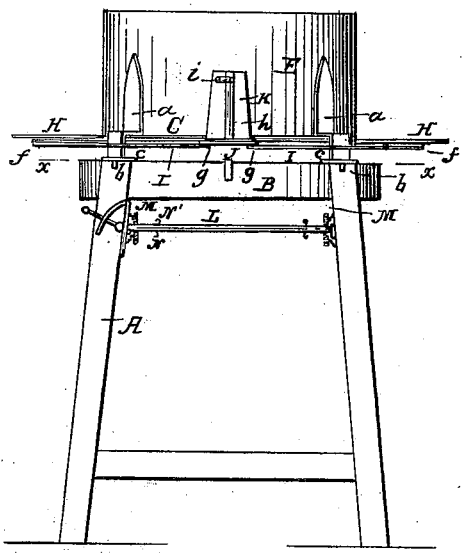
Figure 2:
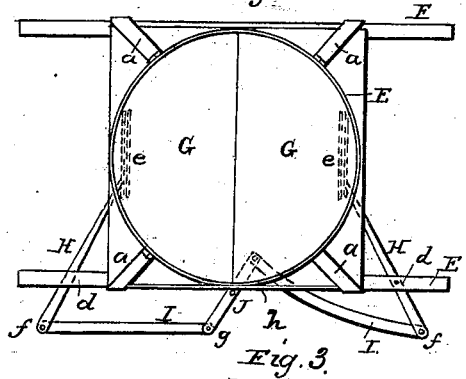
Figure 3:
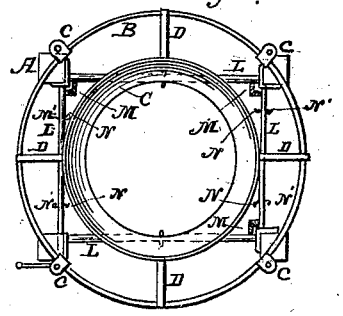

Figure 1 represents an elevation of my invention; Fig. 2, a plan or top view of the same; Fig. 3, a horizontal section of the same, taken in the line $x$ $x$, Fig. 1.

Similar letters of reference indicate like parts.

This invention consists in combining a bag-holder with a measurer in such a manner that a bag may be firmly held with an open mouth for receiving the grain or other substance, and the latter measured before it is allowed to enter the bag, all the parts being arranged in such a manner that grain or other substance may be measured and bagged by a single individual with the greatest facility.

A represents an upright frame, which may be of any suitable height, and having secured upon it two rings, B C, the outer one, B, serving to brace the upper part of the frame, and the inner one, C, which is concentric with B, serving as a guide or funnel to conduct the grain or other substance into the bag. The ring C is of slightly conical form, and is attached to the outer ring, B, by arms D, as shown clearly in Fig. 3.

E is a measurer, which may be of cylindrical or other form, open at its bottom and secured by lugs $a$ to two parallel bars, F F, the lugs $a$ being provided with rods $b$, which pass through plates $c$ on the band B, (see Fig. 1,) and serve to secure the measurer and bars F F to the top of the frame A.

G G are two slides, which are fitted between the bars F F and the lower end of the measure E. The ends of these slides rest on the bars F F, and they are allowed to work freely thereon, and when shoved inward in contact they serve as a bottom for the measure, as shown in Fig. 2. These slides G G are moved by means of two levers, H H, which are connected by fulcrum-pins $d$ to one of the bars F, the inner ends of said levers being fitted between parallel rods or guides $e$ at the under surface of the slides, as shown by the dotted lines in Fig. 1. The outer ends of the levers H H have each an arm, I, connected to them by a pivot, $f$, and the inner end of the arms I I are connected by pivots $g$ $g$ to the ends of a bar, J, which is secured centrally to the lower end of a shaft, K, the bearing $h$ of which is on the exterior of the measure E. The upper end of the shaft K is provided with a handle, $i$, for the convenience of turning the former. By turning the shaft K the levers H H are actuated through the medium of the bar J and arms I I and the slides G G moved toward or from each other. In the upper part of the frame A there are four horizontal shafts, L, placed in the form of a quadrangle and connected at their ends by bevel geared quadrants M, so that by turning one of these shafts all will be turned simultaneously. These shafts L are each provided with hooks N N', which project from opposite sides of them, as shown in Fig. 3. The bag to be filled is secured to these hooks N or N', according to the size or diameter of the bag, the larger bags being secured to the outer hooks, N', the smaller ones on the hooks N. The slides G G are closed and the measure E filled, and the shaft K is then turned so that the levers H H will force apart the slides and the contents of the measure will descend into the bag. When the latter is filled, the shafts L are turned so as to release the bag from the hooks. Thus it will be seen that by this simple device bags may by a single individual be filled with grain or other material, and the latter measured at the same time.

Having thus described my invention, I claim as new and desire to secure by Letters Patent—

1. The slides G G, in combination with the measure E and frame A, or any suitable support, all arranged substantially as and for the purpose set forth.

2. The shafts L, arranged in quadrangular form, provided with hooks N N' and connected by gears M, for the purpose of holding the bag and admitting of the same being liberated therefrom with facility, as herein described.

3. The combination of the measure, slides, and shafts, provided with hooks, all arranged and applied to a suitable frame or support, substantially as and for the purpose set forth.

GEORGE E. RANDALL.

Witnesses:
  SAMUEL F. NORTON,
  WILLIAM H. ROBBINS.